(No Model.)

F. J. ULRICH.
Device for Jointing Saw Teeth.

No. 230,908. Patented Aug. 10, 1880.

Witnesses: H. S. Bates, E. A. Curtis

Inventor: Frederick J. Ulrich
By Joseph Smith, Atty

UNITED STATES PATENT OFFICE.

FREDERICK J. ULRICH, OF OIL CREEK TOWNSHIP, CRAWFORD COUNTY, PENNSYLVANIA.

DEVICE FOR JOINTING SAW-TEETH.

SPECIFICATION forming part of Letters Patent No. 230,908, dated August 10, 1880.

Application filed March 8, 1880. (No model.)

*To all whom it may concern:*

Be it known that I, FREDERICK J. ULRICH, of Oil Creek township, Crawford county, State of Pennsylvania, have invented a new and useful Device for Jointing the Teeth of Saws Previous to Filing, of which the following is a specification.

My invention is more particularly intended for saws having what is called a "raker," or central tooth, somewhat shorter than the cutting-teeth, for the purpose of removing all sawdust and dirt from the saw-kerf, the object being at one operation to joint the cutting-teeth to an even length, and at the same time the rakers are jointed to the relative length required to do good work. I attain this object by attaching to a guide a file of peculiar form, as illustrated in the accompanying drawings, in which—

Figure 1:
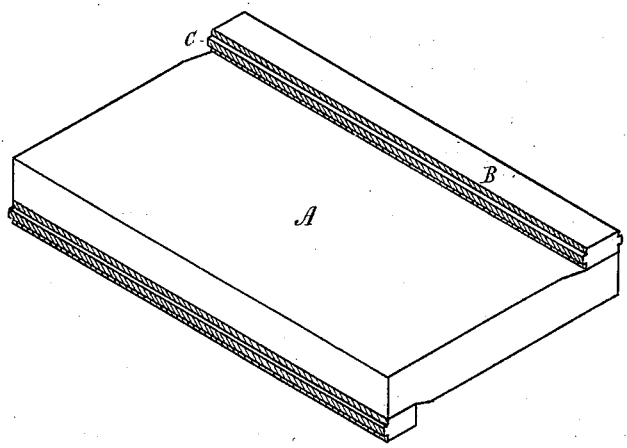
Figure 3:
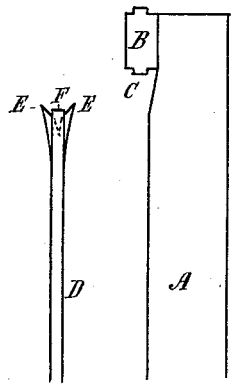
Figure 2:

Figure 1 is an isometrical view of the jointer entire; Fig. 2, a section of saw-plate, showing the cutting-teeth and rakers; and Fig. 3, a section of the jointer, shown as about to be applied to the saw.

A is a block or guide of wood or metal. B is a file having in the center of its cutting-edge the tongue C. D is the saw-plate. E E are cutting-teeth. F F are rakers.

The file B is firmly attached to the guide A, which is countersunk to receive it just sufficiently to bring the tongue C in line with the saw-plate D when the guide is held against the plate.

To use the jointer, the guide A is held against the saw-plate D with the file B resting upon the saw-teeth, the tongue C resting on the rakers, while the shoulders on each side of C rest on the cutting-teeth.

As the guide is moved from end to end of the saw, it is evident that the cutting-teeth are jointed to an even length; also, the rakers are evened and made just as much shorter as the tongue C projects beyond the shoulders of the file B. The saw is then ready for filing in the usual manner.

I claim as my invention—

As a device for jointing the teeth of saws where the teeth are required to be of unequal length, a file, B, provided with a tongue, C, upon its cutting-edge or surface, substantially as described, and for the purposes herein set forth.

FREDERICK J. ULRICH.

In presence of—
  JAMES H. HILL,
  A. B. HOWLAND.